April 14, 1970 H. LOEWENTHAL 3,505,781
DEVICE FOR SEALING COVER SHEETS ONTO CONTAINERS
Filed Nov. 3, 1967 4 Sheets-Sheet 4
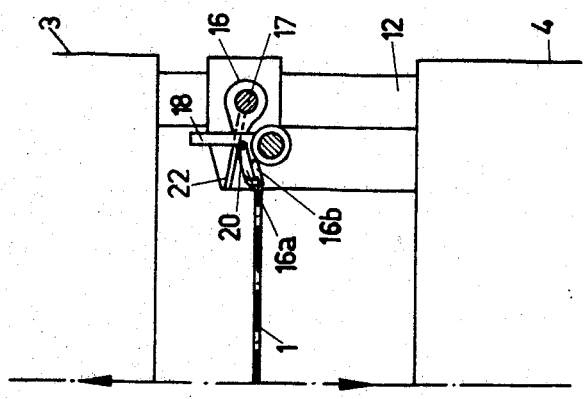
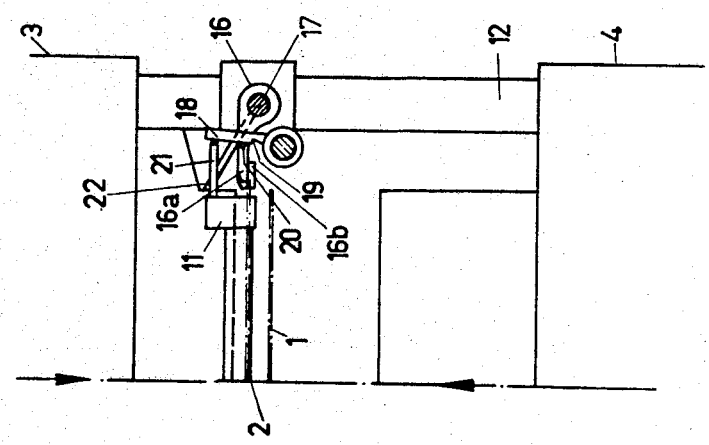
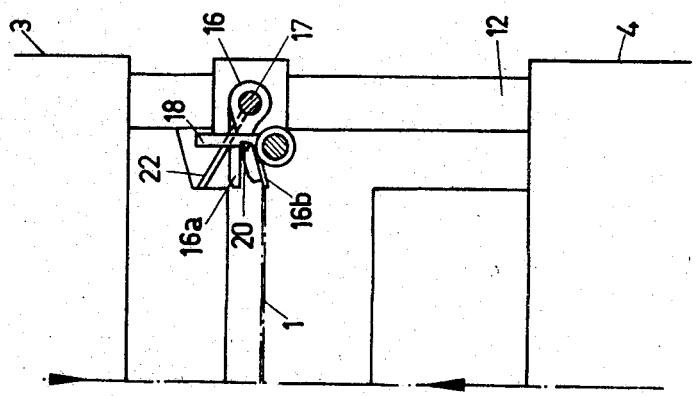

United States Patent Office 3,505,781
Patented Apr. 14, 1970

3,505,781
DEVICE FOR SEALING COVER SHEETS ONTO CONTAINERS
Horst Loewenthal, Neuhausen am Rheinfall, Switzerland, assignor to Schweizerische Industrie-Gesellschaft, Neuhausen am Rheinfall, Switzerland
Filed Nov. 3, 1967, Ser. No. 680,459
Claims priority, application Switzerland, Nov. 11, 1966, 16,242/66
Int. Cl. B65b 7/28
U.S. Cl. 53—329
7 Claims

ABSTRACT OF THE DISCLOSURE

A container sealer is disclosed in which containers molded in a sheet are advanced in one direction and a sealing sheet is advanced in the crosswise direction by clamps. Further clamps, which are automatically opened, closed, and pivoted, prevent the sealing sheet from moving backwards until the sealing operation commences.

BACKGROUND OF THE INVENTION

The invention relates to a sealer for sealing shut containers by pressing a sealing sheet on the rim that surrounds each container. The containers previously have been molded from a sheet of material, and filled.

Machines for automatically molding cup-shaped containers out of a thermo-setting synthetic plastic, and subsequently filling and sealing them, are known in the prior art. The containers, which are still connected together by a web that forms their rims, are then separated.

With these known machines the sealing sheet is advanced in the same direction as the sheet from which the containers were molded. The customary centering device, employing a photo-electric cell, cannot be used with this arrangement of feed. In many instances, however, it is essential to center the sealing sheet, in order that the printing on the sheet is located in the correct position on the sealed container. Previously, if the sealing sheet were a synthetic plastic one resorted to stretching the sheet to center it. When the sealing sheet is aluminum foil, which cannot be stretched, it is centered by buckling the foil, whereby the foil strip is shortened a certain amount. This method is not satisfactory. What is desired is automatic centering, employing a photoelectric centering device which monitors a centering mark printed on the sealing sheet, as commonly practiced in packing engineering.

SUMMARY

In accordance with the invention, space for a photoelectric centering device is provided by advancing the sealing sheet in a direction crosswise to that in which the molded containers are moved.

Further in accordance with the invention, clamps are provided for advancing the sealing sheet and for holding it fast against backward movement until the sealing operation has begun. Means are provided for automatic operation of the clamps.

BRIEF DESCRIPTION OF THE DRAWINGS

FIGS. 5a, 5b, and 5c show the mechanism for, and the step-wise operation of, the end clamps.

DESCRIPTION OF THE PREFERRED EMBODIMENTS

Figure 1:
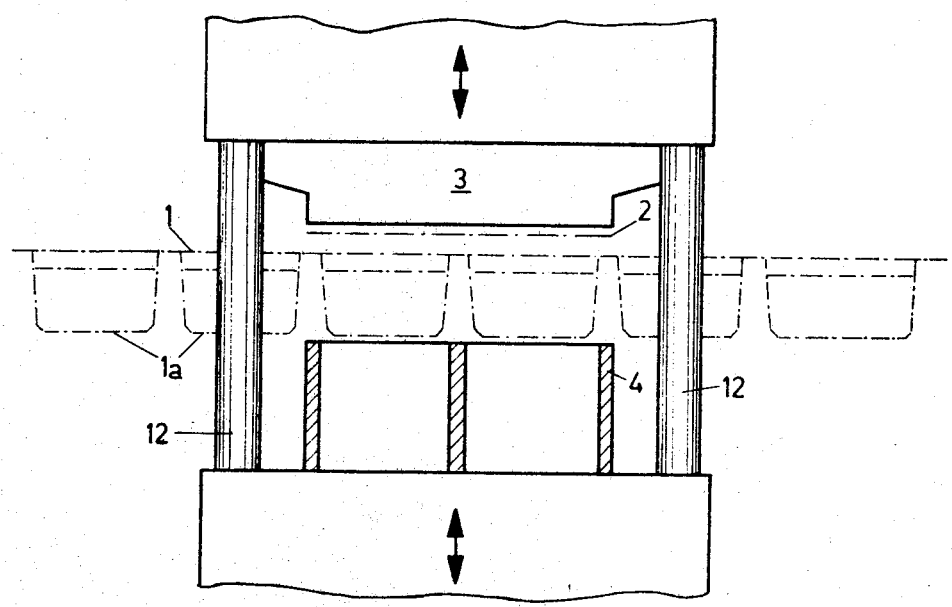
FIGS. 1 and 2 are simplified side views of the steps leading up to and including, the sealing operation.

With reference to FIG. 1, a continuous series of cup-shaped containers 1a are molded from a synthetic plastic sheet 1 by a machine (not shown) for molding thermosetting synthetic plastics. Neighboring containers are still held together by a web of the synthetic plastic sheet that forms a rim surrounding each container. The individual containers have already been filled by a filling machine (not shown); and it only remains to close and seal the containers, using a sealing sheet 2. As is known in the art, an upper sealing implement 3 presses the sheet 2 against the rim of each container 1a. The lower sealing implement 4 supports only the horizontal rim joining neighboring containers, as shown in FIG. 2.

Figure 2:
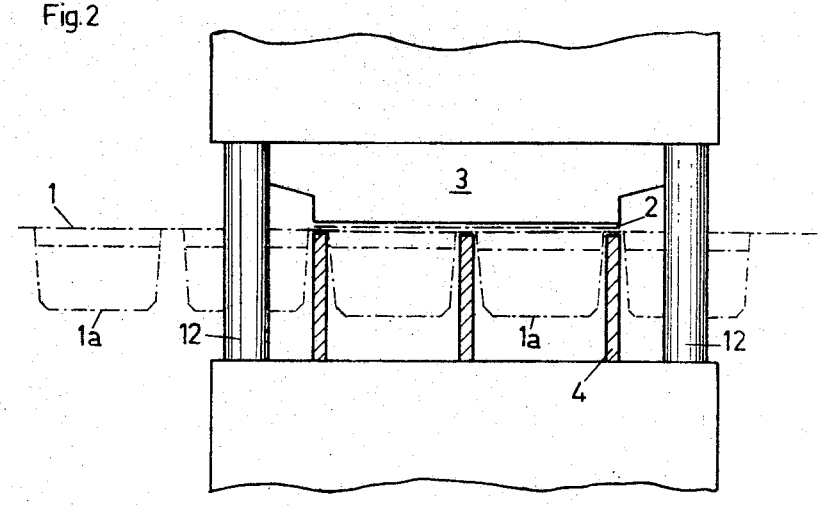
Figure 3:
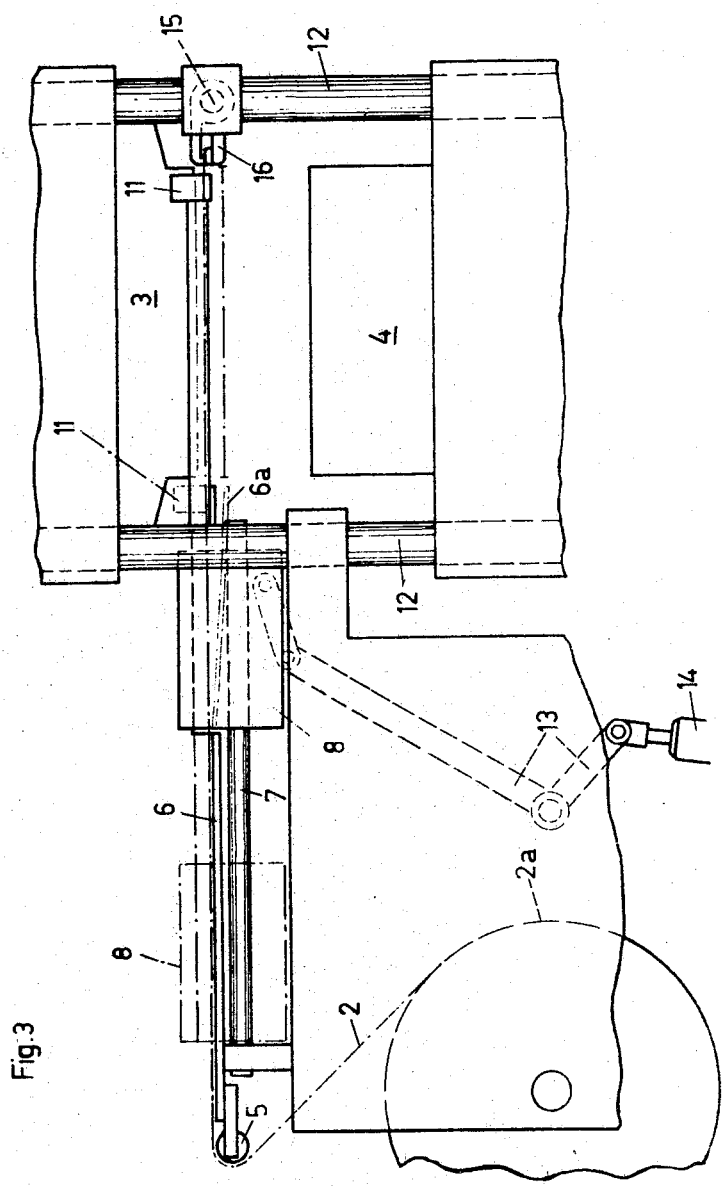
FIG. 3 is a side view of the mechanism for advancing the sealing sheet.

The synthetic plastic sheet 1 and the molded containers 1a are supported in the position illustrated in FIG. 1 by any known and suitable device (not shown), until the lower sealing implement 4 has been raised to the position illustrated in FIG. 2. The sheet 2 is conveyed parallel to the plane and crosswise to the lengthwise direction, of the sheet 1, A side view of the device for supplying the sheet 2 is shown in FIG. 3.

The sheet 2 runs from a supply roll 2a over a roller 5 which changes the direction of the sheet. A guide bar 7 is located on each side of, and extends parallel to, a table 6 that supports the sheet 2 adjacent the sealing implements. Two slides 8, one on each bar 7, connected together by a bar 9, slide along the length of the respective bars 7. To each slide 8 is connected a bar 10 of which the end remote from the respective slide mounts a clamp 11 that serves to grip a respective edge of the sheet 2. The operation of the jaws of the two clamps 11 is known, and will not be described.

Figure 4:
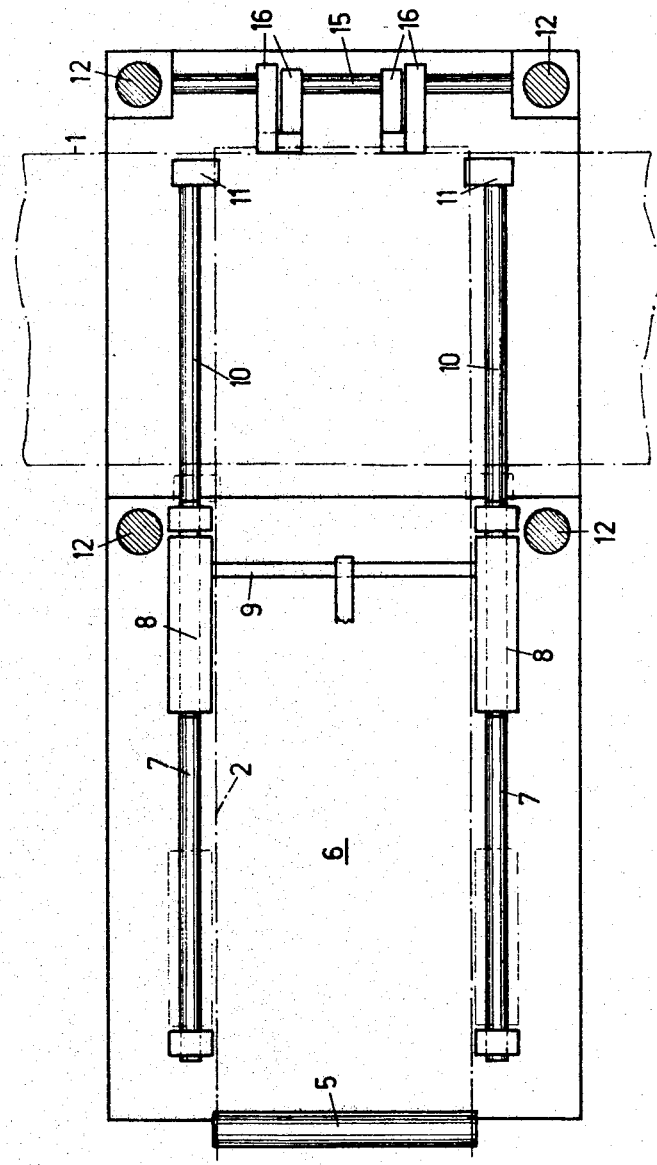
FIG. 4 is a top view of what is shown in FIG. 3.

The slides 8, together with the bars 10 and clamps 11, can be moved back and forth between the positions shown in full line and in dot-dash line (FIGS. 3 and 4), by means of a lever system 13, shown in dash line, actuated by a cylinder and piston 14 which may be hydraulically operated. Four columns 12 guide the upper sealing implement 3 and the supporting member (not referenced, but showing a double-headed arrow) for the lower sealing implement 4 in their vertical movements. The clamps 11 project into the space between the four columns 12.

Two end clamps 16, each incorporating an upper jaw 16a mounted on a bar 15 and a lower jaw 16b mounted on an individual bar 17, serve to grip the end of the sheet 2, which is brought forward by the clamps 11, at least until the sealing operation has begun. The clamps 16 are free to pivot, as will be later described.

The clamps 11 and 16 may be of any suitable and known designs.

During operation of the sealer the clamps 11 draw the sheet 2 between the drawn apart upper and lower sealing implements 3 and 4. The end of the sheet 2 is then gripped and held fast by the clamps 16 until the sealing implements join the web of the sheet 1 to the sheet 2. In the meantime, the clamps 11 have released their hold on the sheet 2, returned to their position shown in dot-dash line, and regripped the sheet 2. A knife (not shown) severs the sheet 2 from the supply roll during the sealing operation. The sealing implements are parted, the sealed containers are moved forward, and the sealer is ready to repeat the sequence of steps just described.

In order that the end 6a of the table 6 nearest the sealing implements can pivot and follow the vertical movement of the sheet 2 when the upper sealing implement 3 is lowered, the end 6a is made resiliently yielding by using a metal leaf. The lower position of the end 6a, assumed during the sealing operation, is shown in dot-dash line in FIG. 3.

By drawing the sheet 2 in a direction perpendicular to the direction of movement of the sheet 1, there is provided above the table 6 sufficient space for mounting a known photoelectric centering device.

The operation of the clamps—their opening and closing and up-and-down movements—can be advantageously controlled by the movement of other parts of the sealer. For example, the clamps 11, at the end of their forward stroke, can act upon the respective clamps 16, causing the latter to close. The downward movement of the upper sealing implement 3 causes the sheet 2 to lower to the sealing position. The lower sealing implement 4 then causes the clamps 16 to open, when the two sheets 1 and 2 have been clamped together by the upper and lower sealing implements. When the two implements part the upper one 3 causes the clamps 16 to return to their original position.

A practical form, following generally the above embodiment, will now be described, with reference to FIGS. 5a, 5b and 5c.

FIG. 5a shows the rest position of the clamps 16, and FIGS. 5b, 5c the position of the various parts during successive steps leading to, and including, the sealing operation. In the rest position the upper jaws 16a are located at the level of the sheet 2, and the lower jaws 16b are locked at the level of the sheet 1 by a respective spring-loaded detent 18 which is pivotally mounted, in any suitable and known manner, next to a lower jaw, and engages in a recess 19 a finger 20 on the lower jaw.

In FIG. 5b the clamps 16 are closed. The closing of the clamps 16 is effected by respective fingers 21 on the clamps 11. As the latter near the end of their forward stroke, as shown in FIG. 5b, the fingers 21 force the respective detents 18 to pivot clockwise, against the spring force, freeing the lower jaws 16b, which move clockwise under the action of spring force to clamp the sheet 2 in the clamps 16.

FIG. 5c shows the upper and lower sealing implements 3 and 4 closed, and all parts in the positions they take during the sealing operation. The clamps 16 have been caused to pivot counterclockwise, to the level of the sheet 1, by a rod 22 operated by the downward movement of the implement 3. Simultaneously, each finger 20 is brought opposite the recess 19 of a respective detent 18, which latter is then free to pivot counterclockwise to lock the respective lower jaw in the position shown. When the sealing implements part and return to their starting positions, the upper jaws 16a are pivoted back to their initial position shown in FIG. 5a.

It will be appreciated that in some applications a single clamp 16 may suffice.

Although the preferred embodiments of the invention have been described, the scope of the invention, and the protection accorded it, are limited solely by the appended claims.

I claim:

1. In a device for sealingly closing containers which are molded from a first sheet of material advanced in one direction, said containers having an outwardly projecting rim around the top thereof and being successively filled, a pair of clamps adapted to grip opposite edges of a second sheet of material and movably mounted to intermittently advance said second sheet transversely of the direction of movement of said first sheet above said rim, upper and lower vertically reciprocable sealing means adapted to sealingly clamp said rim against said second sheet during the intervals between said transverse movements of said second sheet, clamping means positioned and adapted to grip the forward edge of said second sheet during said intervals, and means for releasing said pair of clamps after said second sheet has been gripped by said clamping means.

2. In a device for sealing closing containers which are molded from a first sheet of material advanced in one direction, said containers having an outwardly projecting rim around the top thereof and being successively filled, a pair of clamps adapted to grip opposite edges of a second sheet of material and movably mounted to intermittently advance said second sheet transversely of the direction of movement of said first sheet above said rim, upper and lower vertically reciprocable sealing means adapted to sealingly clamp said rim against said second sheet during the intervals between said transverse movements of said second sheet, clamping means positioned and adapted to grip the forward edge of said second sheet during said intervals, means for releasing said pair of clamps after said second sheet has been gripped by said clamping means, and a table for supporting said second sheet immediately adjacent said sealing means, the end of said table nearest said sealing means being resiliently yielding to permit said second sheet to be moved up and down by said sealing means.

3. The device according to claim 2, wherein said second sheet is moved up and down by said upper sealing means.

4. In a device for sealingly closing containers which are molded from a first sheet of material advanced in one direction, said containers having an outwardly projecting rim around the top thereof and being successively filled, a pair of clamps adapted to grip opposite edges of a second sheet of material and movably mounted to intermittently advance said second sheet transversely of the direction of movement of said first sheet above said rim, upper and lower vertically reciprocable sealing means adapted to sealingly clamp said rim against said second sheet during the intervals between said transverse movements of said second sheet, clamping means positioned and adapted to grip the forward edge of said second sheet during said intervals, means for releasing said pair of clamps after said second sheet has been gripped by said clamping means, a pair of slides carrying said pair of clamps, and means supporting said slides for reciprocatory horizontal movement one along each side of said second sheet between a starting position, in which said pair of clamps are caused to grip said second sheet, and an end position in which said second sheet covers said containers.

5. In a device for sealingly closing containers which are molded from a first sheet of material advanced in one direction, said containers having an outwardly projecting rim around the top thereof and being successively filled, a pair of clamps adapted to grip opposite edges of a second sheet of material and movably mounted to intermittently advance said second sheet transversely of the direction of movement of said first sheet above said rim, upper and lower vertically reciprocable sealing means adapted to sealingly clamp said rim against said second sheet during the intervals between said transverse movements of said second sheet, clamping means positioned and adapted to grip the forward edge of said second sheet during said intervals, means for releasing said pair of clamps after said second sheet has been gripped by said clamping means, a pair of slides carrying said pair of clamps, means supporting said slides for reciprocatory horizontal movement one along each side of said second sheet between a starting position, in which said pair of clamps are caused to grip said second sheet, and an end position in which said second sheet covers said containers, said clamping means comprising an upper jaw and a lower jaw, means pivotally supporting said upper and lower jaws with the upper jaw in released position of said clamping means being disposed at the level of said second sheet and the lower jaw being disposed at the level of said rim, operating means for pivoting said lower jaw to a position where it clamps said second sheet against said upper jaw, and control means operated by said upper sealing means for causing said upper and lower jaws to pivot together to the level of said rim and for causing said upper jaw to pivot away from said lower jaw upon completion of the sealing operation.

6. The device according to claim 5, in which said operating means comprises a finger on one of the clamps of said pair of clamps and said control means comprises a rod for pivoting said upper jaw, the position of said rod being determined by the position of said upper sealing means, and pivotally mounted locking means spring biased to a first position in which said locking means locks said lower jaw in its normal position, said finger causing said locking means to pivot to a second position in which said lower jaw is unlocked and free to pivot, under spring action, to close with said upper jaw.

7. The device according to claim 6, in which said clamping means comprises two clamps each provided with said operating means and said locking means for cooperation with one clamp of said pair of clamps.

References Cited

UNITED STATES PATENTS

| | | | |
|---|---|---|---|
| Re. 25,466 | 10/1963 | Kostur | 53—184 X |
| 2,894,363 | 7/1959 | Voogd | 53—389 X |
| 3,347,011 | 10/1967 | Lovas et al. | 53—184 X |
| 3,352,087 | 11/1967 | Kobick | 53—389 |

THERON E. CONDON, Primary Examiner

R. L. SPRUILL, Assistant Examiner

U.S. Cl. X.R.

53—389